_United States Patent_ [19]

Endsley

[11] 3,778,258

[45] Dec. 11, 1973

[54] TITANIUM BRAZING ALLOY
[75] Inventor: Richard A. Endsley, Van Nuys, Calif.
[73] Assignee: Alloy Metals, Inc., Troy, Mich.
[22] Filed: Dec. 18, 1972
[21] Appl. No.: 316,174

Related U.S. Application Data
[63] Continuation-in-part of Ser. No. 102,080, Dec. 28, 1970, abandoned.

[52] U.S. Cl. ................................. 75/173 R, 29/504
[51] Int. Cl. ................................................ C22c 5/00
[58] Field of Search ................. 75/172, 173; 29/504

[56] References Cited
UNITED STATES PATENTS

| | | | |
|---|---|---|---|
| 2,824,359 | 2/1958 | Rhodes et al. .................... | 29/504 X |
| 2,914,848 | 12/1959 | Blum et al. ..................... | 75/173 R X |
| 3,159,481 | 12/1964 | Harrigan et al. .................. | 75/173 R |
| 3,600,144 | 8/1971 | Csakvary ........................... | 75/173 R |
| 3,702,763 | 11/1972 | Gamer et al. ..................... | 75/173 R |

FOREIGN PATENTS OR APPLICATIONS

| | | | |
|---|---|---|---|
| 755,701 | 1934 | France ............................. | 75/173 R |
| 1,001,291 | 8/1965 | Great Britain .................... | 75/173 R |

_Primary Examiner_—J. Spencer Overholser
_Assistant Examiner_—Ronald J. Shore
_Attorney_—Raymond E. Scott

[57] ABSTRACT

A strong, ductile, corrosion resistant alloy suitable for brazing titanium and titanium based alloys comprising a mixture of about 3–30 percent aluminum, about 3–17 percent palladium and about 55–94 percent silver.

2 Claims, No Drawings

TITANIUM BRAZING ALLOY

RELATED APPLICATIONS

This application is a continuation-in-part application of my copending application for United States patent, Ser. No. 102,080, filed Dec. 28, 1970, now abandoned.

BACKGROUND OF INVENTION

Available brazing materials used for brazing together parts made of titanium and titanium based aloys have low corrosion resistance, poor strength and ductility or require too high a brazing temperature, thus adversely affecting the base metals. Numerous attempts have been made to reduce these problems, particularly that of corrosion resistance, but with only limited success.

Examples of brazing alloys used in the past are described in the patent to Blum, U.S. Pat. No. 2,914,848 granted Dec. 1, 1959 which discloses a braze alloy for titanium parts formed of silver, aluminum and tin, and the patent to Roeder et al, U.S. Pat. No. 3,411,900 granted Nov. 19, 1968, describing a brazing alloy made of silver base plus palladium, copper, nickel, with trace amounts of aluminum, boron and sulfur. Another example is described in the patent to Horrigan, U.S. Pat. No. 3,159,481 granted Dec. 1, 1964, which discloses a brazing alloy formed of silver, aluminum and magnesium.

In all of these, corrosion resistance is not adequate nor are the resultant braze joint strength and ductility.

Efforts have been made in the past to utilize silver plus palladium such as in the amounts of 95 percent silver and 5 percent palladium or 96 percent silver and 4 percent palladium. Such brazing materials have been found to have too high a brazing temperature for brazing titanium.

Brazing materials have also been made out of silver plus aluminum, such as in the amounts of 5 percent aluminum and 95 percent silver. These have exhibited very poor corrosion resistance.

Other combinations of metals have also been tried but generally all have been inadequate in exhibiting high corrosion resistance and in addition, the resultant braze strength and ductility has not been adequate for many uses, such as the use of titanium in aircraft and missile parts.

Thus, this invention relates to an improved brazing alloy, which is highly corrosion resistant and still strong and ductile and which is applied at relatively low brazing temperatures, thus minimizing adverse affects upon the brazed parts.

SUMMARY OF INVENTION

The invention herein contemplates forming an alloy particularly, but not exclusively for brazing titanium and titanium based alloys comprising a mixture of about 3–30 percent aluminum, about 3–17 percent palladium and the balance silver, in the range of about 55–94 percent all by weight.

Where either the aluminum or the palladium or both are in amounts less than about 3 percent, there is a marked reduction in corrosion resistance so that the approximate 3 percent by weight limit appears to be the point or zone where corrosion resistance improves to the point of producing the desired results. It has now been discovered that a greater percentage of palladium, in the range of about 8 to 15 percent, improves the corrosion resistance of the braze, especially at the toe of the braze fillet.

This mixture of silver, palladium and aluminum is appliable at relatively low brazing temperatures, such as ranging from about 1,200° to about 1,900°F, inversely proportional to the approximate amount of aluminum, and unexpectedly exhibits considerably greater strength of brazed joint, considerably out of proportion to what has previously been found in using either silver plus palladium alone or silver plus aluminum alone. Likewise, its corrosion resistance is also unexpectedly out of proportion to the use of either silver plus palladium or silver plus aluminum alone particularly beginning at the about 3 percent level. It has also been discovered that certain other additions may be made to the brazing alloy of this invention which will further improve the properties, but which are not claimed herein.

These and other objects and advantages of this invention will become apparent upon reading the following description.

DETAILED DESCRIPTION

The brazing material contemplated herein is applied to abutting parts made of titanium or conventional titanium based alloys, although it also may be used on stainless steels and other steels. The brazing is affected by applying the brazing powders, after cleaning the joint to be brazed of impurities, grease, dirt and the like, after which the parts to be brazed are placed in a brazing oven at the appropriate temperature for melting and flowing the brazing alloy. Upon cooling or setting of the brazing alloy, a suitable braze may be obtained.

The amount of time required in the heating oven is not critical at all and may be varied as appears necessary for proper melting and filling of the joint to be brazed.

The alloy herein seems to have a minimal effect upon the base material, particularly minimizing or eliminating the tendency of the brazing alloy to erode the base metal.

It has been found that the mixture of silver, aluminum and palladium must have at least about 3 percent by weight of palladium and aluminum, in order to provide adequate corrosion resistance, with lower amounts of either or both of these producing either poor or only fair corrosion resistance. Thus, since one of the essential objectives of this alloy is to provide good corrosion resistance, the about 3 percent seems to be the dividing line between poor corrosion resistance and good corrosion resistance, although the 3 percent is not precise but may be varied in a very slight amount as illustrated below by the examples.

An example of this material has been the use of a mixture of 2.5 percent aluminum plus 2.5 percent palladium, with the balance silver, all by weight. A braze formed on the joint of titanium alloy parts exhibited poor corrosion resistance, unacceptable for high class brazing of missiles or aircraft parts, particularly of the supersonic type where good corrosion resistance is important. In addition, its strength was not satisfactory.

Another example tested was 2.8 percent palladium plus 3.9 percent aluminum, with the balance silver. The brazing temperature was about 1,780°F, as was the case of the preceding alloy mentioned above. This alloy exhibited only fair corrosion resistance, still inadequate.

Another example of 3 percent aluminum, 3 percent palladium and 94 percent silver brazed at 1,780°F showed a good corrosion resistance, adequate for the purpose, with high strength.

Other examples are given below in a table of examples:

Table of Examples (Percent by weight)

| | Palladium | Aluminum | Silver | Braze Temp. |
|---|---|---|---|---|
| Example 1 | 3.5% | 3.8% | Balance | 1780°F |
| Example 2 | 4.0% | 8.0% | balance | 1500°F |
| Example 3 | 4.0% | 20% | balance | 1250°F (approx) |
| Example 4 | 4.0% | 30% | balance | 1200°F (approx) |
| Example 5 | 10.0% | 10% | balance | 1425°F (approx) |

In all cases, the corrosion resistance was very good and the braze exhibited a high strength, as for example, Examples 1 and 2 above illustrated shear strength of 28,000 and 35,000 psi, maintaining good ductility. The last example, Example 5, brazes at a relatively low temperature and exhibits an improved corrosion resistance barrier at the toe of the braze fillet.

As can be seen, the percentages may be varied somewhat but the optimum ranges for maximum strength, very good corrosion resistance with good ducility and a low brazing temperature appears to be in the ranges of about 3.5–6 percent by weight palladium, about 3.5–10 percent aluminum (but closer to the 8 percent), with the balance silver. Certain other elements may be added to the brazing alloy of this invention to further improve the brazing characteristics, provided that the palladium, aluminum and silver are within the ranges stated above.

In applying the braze, it is preferable to use a brazing furnace having a non-oxidizing atmosphere, such as an argon or helium atmosphere or a vacuum in order to preserve the characteristics of the titanium or titanium alloy parts. In brazing, using the above alloy and as described above, there is only limited diffusion of the titanium back into the brazed joint, thereby further increasing corrosion resistance of the alloy, in addition to the minimal tendency of the alloy to erode the base metal which also increases corrosion resistance.

Having fully described an operative embodiment of this invention, I now claim:

1. A brazing alloy composition principally for brazing titanium, consisting essentially of:

from about 3–30 percent by weight of aluminum;
from about 3–17 percent by weight of palladium; and
from about 55–94 percent by weight silver.

2. A brazing alloy composition principally for brazing titanium, consisting essentially of:

from about 3.5–20 percent by weight of aluminum;
from about 3.5–17 percent by weight of palladium; and
balance being silver.

* * * * *